(12) United States Patent
Okazaki et al.

(10) Patent No.: US 11,769,934 B2
(45) Date of Patent: Sep. 26, 2023

(54) THERMISTOR ATTACHMENT CONFIGURATION FOR A BUS BAR MODULE

(71) Applicants: Yazaki Corporation, Tokyo (JP); Toyota Jidosha Kabushiki Kaisha, Toyota (JP)

(72) Inventors: Yutaro Okazaki, Kakegawa (JP); Hiraku Tanaka, Makinohara (JP); Shinsuke Azuma, Makinohara (JP); Hiroyuki Kato, Makinohara (JP); Shigeyuki Inoue, Toyota (JP); Takenori Tsuchiya, Toyota (JP)

(73) Assignees: Yazaki Corporation, Tokyo (JP); Toyota Jidosha Kabushiki Kaisha, Toyota (JP)

( * ) Notice: Subject to any disclaimer, the term of this patent is extended or adjusted under 35 U.S.C. 154(b) by 206 days.

(21) Appl. No.: 17/104,971

(22) Filed: Nov. 25, 2020

(65) Prior Publication Data
US 2021/0167348 A1 Jun. 3, 2021

(30) Foreign Application Priority Data
Nov. 29, 2019 (JP) .................................. 2019-216701

(51) Int. Cl.
*H01M 50/502* (2021.01)
*H01M 10/48* (2006.01)
(Continued)

(52) U.S. Cl.
CPC ....... *H01M 50/502* (2021.01); *H01M 10/482* (2013.01); *H01M 10/486* (2013.01);
(Continued)

(58) Field of Classification Search
CPC ..... H01M 2200/105; H01M 2200/106; H01M 2200/108; H01M 10/482; H01M 10/486
See application file for complete search history.

(56) References Cited

U.S. PATENT DOCUMENTS

2010/0285340 A1* 11/2010 Matsunaga .......... G01D 11/245
429/90
2012/0323511 A1* 12/2012 Saigo .................. H01M 10/486
702/63
(Continued)

FOREIGN PATENT DOCUMENTS

| CN | 103811708 A | 5/2014 |
|---|---|---|
| JP | 2011-018454 A | 1/2011 |
| JP | 2014-093163 A | 5/2014 |

*Primary Examiner* — Matthew W Van Oudenaren
(74) *Attorney, Agent, or Firm* — Banner & Witcoff, Ltd.

(57) ABSTRACT

A bus bar module includes: a case attached to a battery assembly including a plurality of single cells; a bus bar supported by the case and electrically connected to electrodes of the plurality of single cells of the battery assembly; and a plurality of electric wires routed in the case. The plurality of electric wires include: a plurality of voltage detection electric wires connected to the bus bar, and a temperature measurement electric wire connected to a thermistor configured to measure a temperature of at least one of the plurality of single cells. The case includes: an electric wire routing groove portion in which the plurality of voltage detection electric wires are routed, and a thermistor attachment portion to which the thermistor is attached. The thermistor attachment portion is provided in the electric wire routing groove portion.

5 Claims, 7 Drawing Sheets

(51) Int. Cl.
*H01M 50/209* (2021.01)
*H01M 50/507* (2021.01)
*H01M 50/569* (2021.01)

(52) U.S. Cl.
CPC ........ *H01M 50/209* (2021.01); *H01M 50/507* (2021.01); *H01M 50/569* (2021.01); *H01M 2200/10* (2013.01); *H01M 2220/20* (2013.01)

(56) References Cited

U.S. PATENT DOCUMENTS

| | | | |
|---|---|---|---|
| 2015/0079437 A1* | 3/2015 | Jeong | H01M 50/271 429/90 |
| 2015/0303435 A1* | 10/2015 | Ikeda | H01M 50/20 429/121 |
| 2020/0091494 A1* | 3/2020 | Fernandez-Galindo | H01M 10/482 |

* cited by examiner

THERMISTOR ATTACHMENT CONFIGURATION FOR A BUS BAR MODULE

CROSS-REFERENCE TO RELATED APPLICATIONS

This application is based on and claims the benefit of priority of Japanese Patent Application No. 2019-216701 filed on Nov. 29, 2019, the enter contents of which are incorporated herein by reference.

FIELD

One or more aspects of the present invention relate to a bus bar module.

BACKGROUND

A power supply device mounted on various vehicles such as an electric vehicle that travels using an electric motor or a hybrid vehicle that travels using an engine and an electric motor in combination is provided with a bus bar module that accommodates a plurality of bus bars electrically connected to electrodes of a plurality of single cells.

The bus bar module includes an accommodating portion for accommodating a thermistor that measures a temperature of the single cell and transmits the measured temperature to a control device. A control device controls a cooling device or the like so as to keep a power supply device at an appropriate temperature based on a temperature of a single cell measured by a thermistor (see, for example, JP-A-2011-18454).

SUMMARY

However, in a bus bar module described in JP-A-2011-18454, since a detection wire (electric wire for temperature measurement) drawn upward from the thermistor is bent and routed to a side, it becomes bulky upward. In addition, the bus bar module includes an accommodating portion for accommodating the thermistor, in addition to an electric wire routing groove portion for accommodating electric wires extending from a plurality of voltage detection terminals or thermistors connected to bus bars and regulating a routing path, in a case, which results in an increases in size of the case. In addition, in the bus bar module, the accommodating portion of the thermistor provided in the case or a routing groove portion accommodating the detection wire drawn out from the thermistor may protrude above a smoke exhaust portion provided between the electrodes of the single cell, which may hinder release of gas from the smoke exhaust portion of the single cell.

One or more aspects of the present invention have been made in view of the above circumstances, and an object thereof is to provide a bus bar module that can be reduced in size and height while suppressing an influence on a battery.

The object of one or more aspects of the present invention can be achieved by the following configurations.

(1) A bus bar module including:
a case attached to a battery assembly including a plurality of single cells;
a bus bar supported by the case and electrically connected to electrodes of the plurality of single cells of the battery assembly; and
a plurality of electric wires routed in the case,
wherein the plurality of electric wires include:
a plurality of voltage detection electric wires connected to a plurality of voltage detection terminals, respectively, the plurality of voltage detection terminals being connected to the bus bar, and
a temperature measurement electric wire connected to a thermistor configured to measure a temperature of at least one of the plurality of single cells,
wherein the case includes:
an electric wire routing groove portion in which the plurality of voltage detection electric wires are routed, and
a thermistor attachment portion to which the thermistor is attached, and
wherein the thermistor attachment portion is provided in the electric wire routing groove portion.

According to the bus bar module having the configuration (1) described above, the thermistor attachment portion to which the thermistor is attached is provided in the electric wire routing groove portion in which the voltage detection electric wire is routed. As a result, size of the case can be reduced as compared with a case where the thermistor attachment portion is provided separately from the electric wire routing groove portion. In addition, it is possible to suppress such a problem that the thermistor attachment portion provided separately from the electric wire routing groove portion protrudes above the smoke exhaust portion provided between the electrodes of the single cell to inhibit the release of the gas.

(2) The bus bar module according to the configuration (1), wherein the thermistor is mounted to the thermistor attachment portion from above the case, and
wherein the temperature measurement electric wire is drawn out from the thermistor attached to the thermistor attachment portion in a direction perpendicular to an attaching direction of the thermistor to the thermistor attachment portion.

According to the bus bar module having the configuration (2) described above, the temperature measurement electric wire drawn out from the thermistor attached to the thermistor attachment portion is routed to a side perpendicular to the attaching direction of the thermistor to the thermistor attaching portion. As a result, height of the bus bar module can be reduced by suppressing bulkiness of the temperature measurement electric wire drawn out from the thermistor upward.

(3) The bus bar module according to the configuration (2), wherein the thermistor is attached to the thermistor attachment portion such that a drawing direction of the temperature measurement electric wire coincides with an extending direction of the electric wire routing groove portion, and
wherein the temperature measurement electric wire drawn out from the thermistor is routed together with the plurality of voltage detection electric wires in the electric wire routing groove portion.

According to the bus bar module having the configuration (3) described above, the temperature measurement electric wire drawn to the side from the thermistor is routed in the electric wire routing groove portion in a direction that coincides with the voltage detection electric wire. As a result, the routing groove portion in which the temperature measurement electric wire is routed can be eliminated, and the two electric wires for the temperature measurement do not overlap each other, thereby further reducing the size of the case. In addition, it is possible to suppress such a problem that the routing groove portion in which the temperature measurement electric wire is routed protrudes above the smoke exhaust portion provided between the electrodes of the single cell to inhibit the release of the gas.

According to one or more aspects of the present invention, it is possible to provide the bus bar module that can be reduced in the size and the height while suppressing the influence on the battery.

One or more aspects of present invention have been briefly described as above. Details of the present invention will be further clarified by reading a mode (hereinafter, referred to as "embodiment") for carrying out the one or more aspects of present invention described below with reference to the accompanying drawings.

BRIEF DESCRIPTION OF DRAWINGS

FIGS. 4A and 4B are views showing a thermistor, in which

FIGS. 7A and 7B are views showing a bus bar module according to a reference example including a thermistor accommodating portion separated from an electric wire routing groove portion, in which

DETAILED DESCRIPTION

Hereinafter, an embodiment of the present invention will be described with reference to the drawings.

Figure 1:
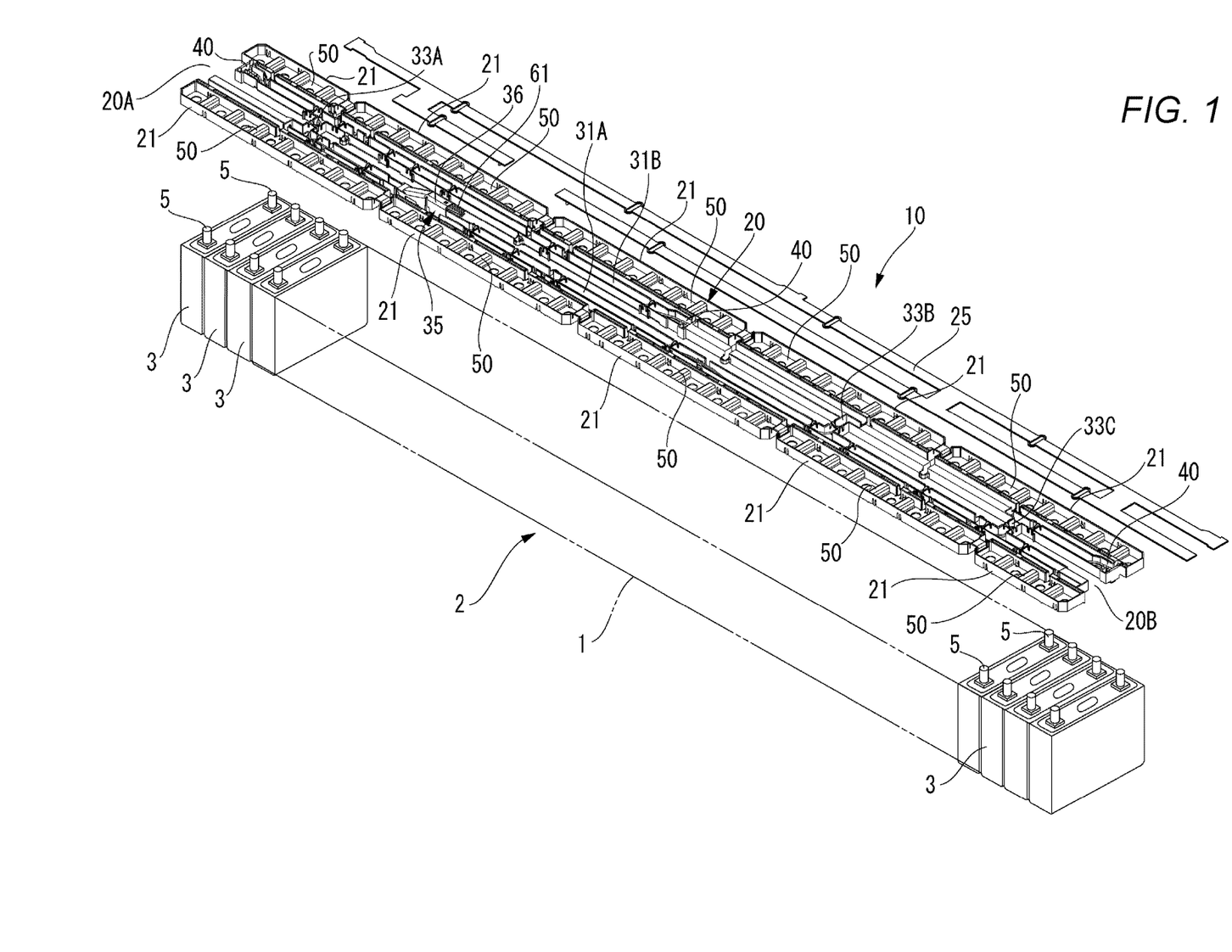
FIG. 1 is a perspective view of a bus bar module and a battery assembly according to an embodiment of the present invention.

FIG. 1 is a perspective view of a bus bar module 10 and a battery assembly 1 according to the embodiment of the present invention.

As shown in FIG. 1, the bus bar module 10 according to the present embodiment is attached to an upper portion of the battery assembly 1 to constitute a power supply device 2. The power supply device 2 is mounted on and used in various vehicles such as an electric vehicle that travels using an electric motor, and a hybrid vehicle that travels using an engine and an electric motor in combination, and supplies power to the electric motor.

The battery assembly 1 includes a plurality of single cells 3 arranged in a row along one direction. Each of the single cells 3 is formed in a rectangular parallelepiped shape, and includes a pair of electrodes 5 provided so as to protrude from one end and the other end of an upper surface. One of the pair of electrodes 5 is a positive electrode and the other one is a negative electrode.

In the battery assembly 1, the plurality of (four in this example) single cells 3 adjacent to each other are set to one set, and poles of the electrodes 5 are aligned. The bus bar module 10 connects sets of the single cells 3 in series by bus bars 50 to be described later.

Figure 2:
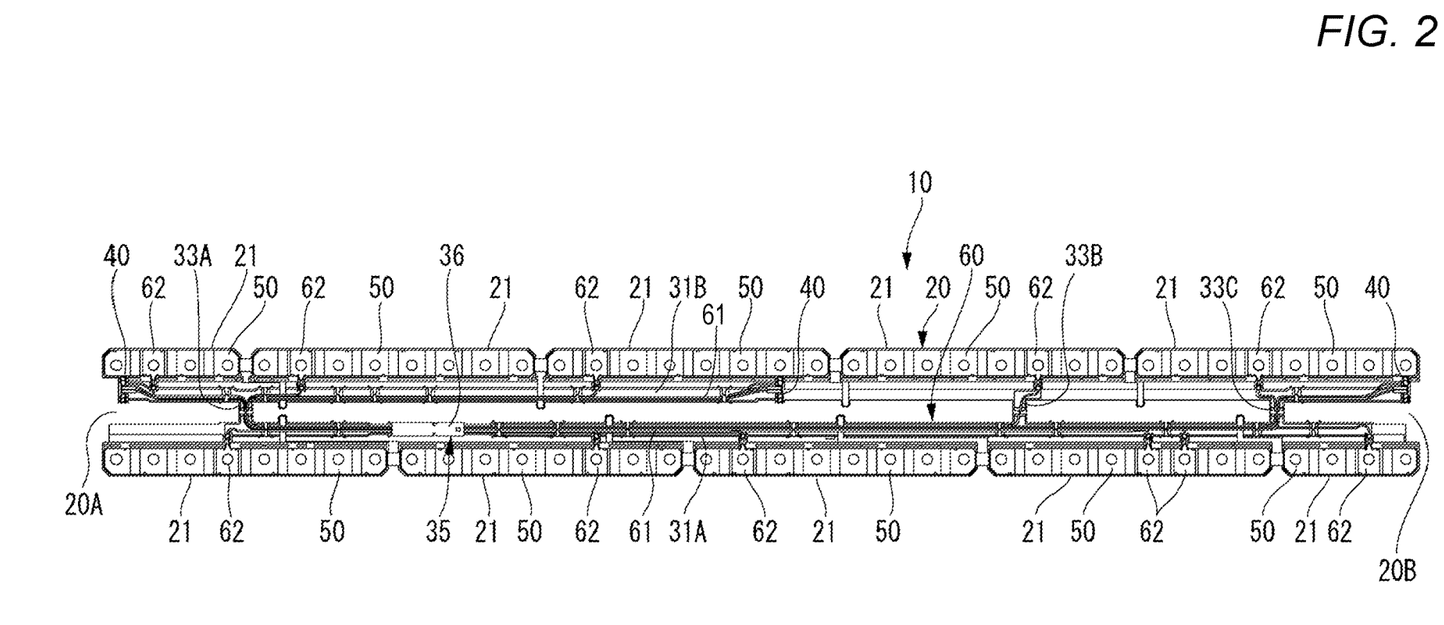
FIG. 2 is a plan view of the bus bar module according to the present embodiment.
Figure 3:
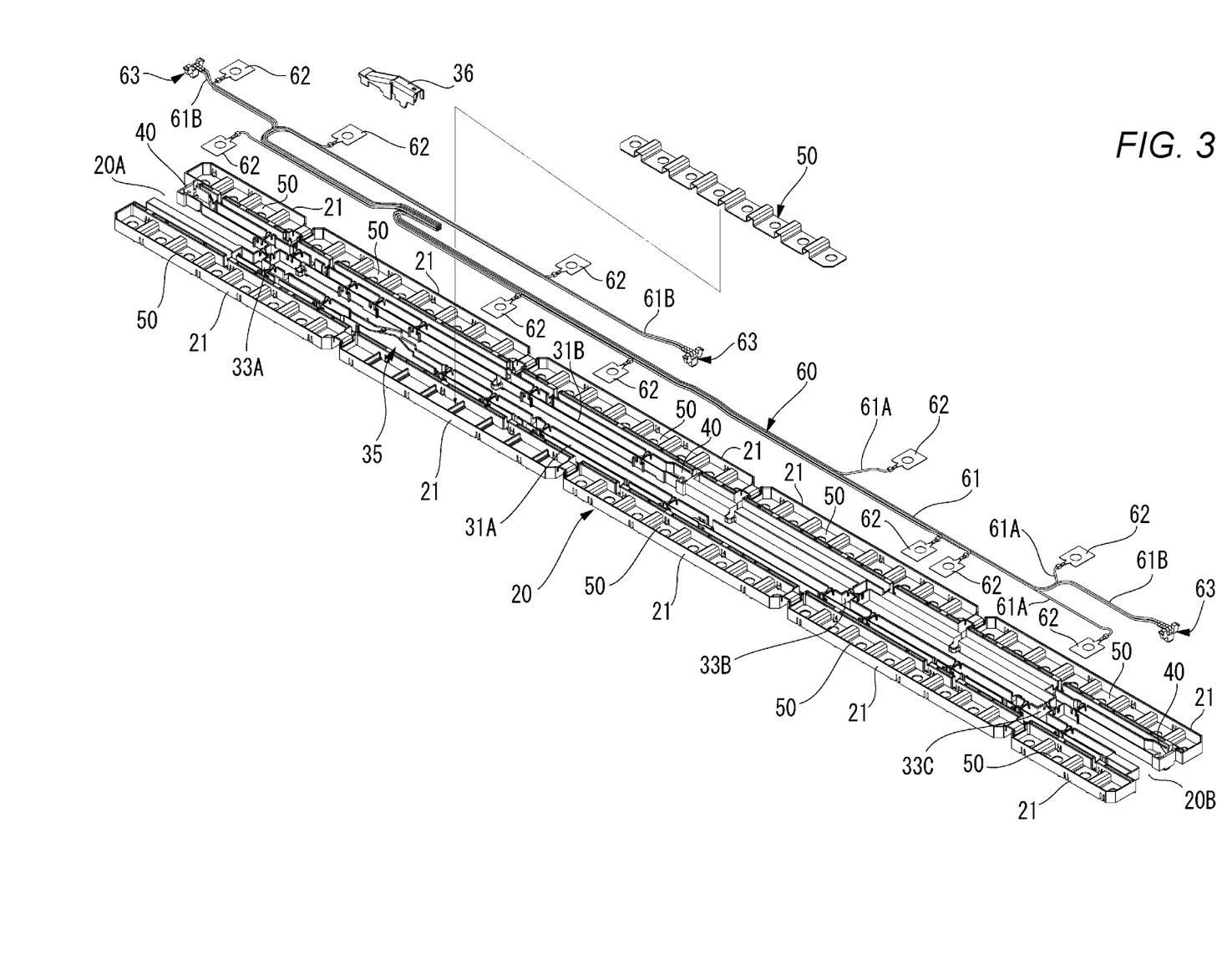
FIG. 3 is an exploded perspective view of the bus bar module according to the present embodiment.

FIGS. 2 and 3 are a plan view and an exploded perspective view of the bus bar module 10 according to the present embodiment.

As shown in FIGS. 2 and 3, the bus bar module 10 includes a case 20, the bus bars 50, and a wire harness 60 including a plurality of electric wires 61.

The case 20 is integrally formed of, for example, an electrically insulating synthetic resin or the like, and includes a plurality of bus bar accommodating portions 21.

The bus bar accommodating portions 21 are arranged in two rows along an arrangement direction of the plurality of single cells 3. The bus bar accommodating portion 21 is formed in a frame shape, and the bus bar 50 is accommodated in the bus bar accommodating portion 21.

A first electric wire routing groove portion 31A and a second electric wire routing groove portion 31B are provided between the two rows of bus bar accommodating portions 21. The first electric wire routing groove portion 31A and the second electric wire routing groove portion 31B are formed along the rows of the bus bar accommodating portions 21 in a longitudinal direction of the case 20, respectively. In addition, a first electric wire passing portion 33A, a second electric wire passing portion 33B, and a third electric wire passing portion 33C are provided between the first electric wire routing groove portion 31A and the second electric wire routing groove portion 31B.

The first electric wire passing portion 33A is provided in the vicinity of one end 20A of the case 20, the second electric wire passing portion 33B is provided in the middle of the case 20, and the third electric wire passing portion 33C is provided in the vicinity of the other end 20B of the case 20. As shown in FIG. 1, a cover 25 is mounted to the case 20 from above. By mounting the cover 25 to the case 20, the first electric wire routing groove portion 31A, the second electric wire routing groove portion 31B, the first electric wire passing portion 33A, the second electric wire passing portion 33B, and the third electric wire passing portion 33C are covered with the cover 25.

The case 20 includes an electric wire take-out portion 35. The electric wire take-out portion 35 is provided between the first electric wire passing portion 33A and the second electric wire passing portion 33B in the first electric wire routing groove portion 31A. An electric wire holding cover 36 can be mounted to the electric wire take-out portion 35 from above.

As shown in FIG. 3, the plurality of electric wires 61 constituting the wire harness 60 include voltage detection electric wires 61A (electric wires for voltage detection) to which voltage detection terminals 62 are connected to end portions, and temperature measurement electric wires 61B (electric wires for temperature measurement) to which thermistors 63 are connected to end portions. The voltage detection terminal 62 is fastened to the electrode 5 of the single cell 3 together with the bus bar 50, and is electrically connected to the bus bar 50. In addition, the thermistor 63 is brought into contact with a specific single cell 3 of the battery assembly 1 to measure a temperature of the single cell 3. Each electric wire 61 of the wire harness 60 is connected to a control circuit board (not shown) including a voltage monitoring circuit and a temperature monitoring circuit.

The electric wires 61 of the wire harness 60 are accommodated and routed in the first electric wire routing groove portion 31A, the second electric wire routing groove portion 31B, the first electric wire passing portion 33A, the second electric wire passing portion 33B, and the third electric wire passing portion 33C. The voltage detection electric wires 61 are drawn out to the outside from the electric wire take-out portion 35 provided in the first electric wire routing groove portion 31A and are connected to the control circuit board.

The second electric wire routing groove portion 31B according to the present embodiment is provided with thermistor attachment portions 40 at one end 20A of the case 20, a substantially central portion of the case 20, and the other end 20B of the case 20. The thermistors 63 provided at the end portions of the temperature measurement electric wires 61B of the wire harness 60 are respectively attached to the thermistor attachment portions 40.

Figure 4A:
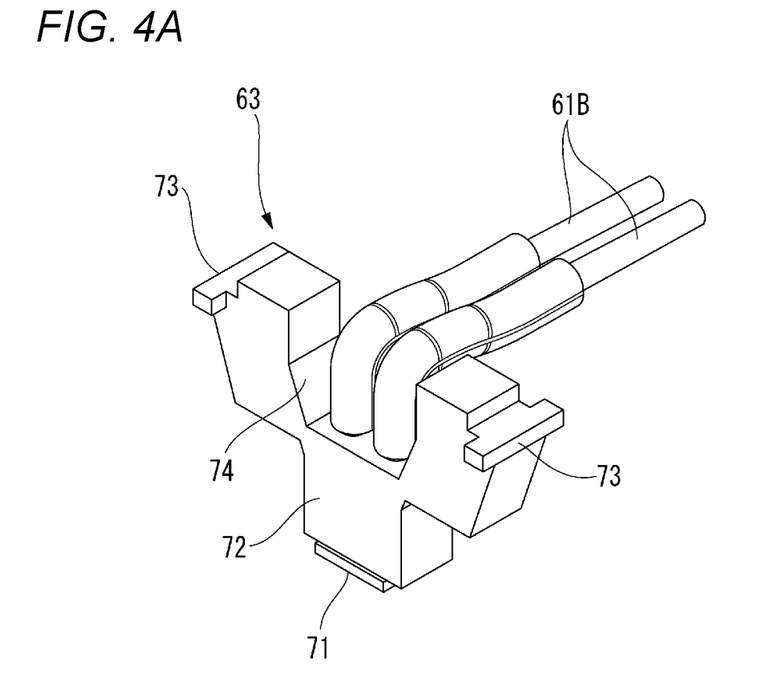
FIG. 4A is a perspective view from above.
Figure 4B:
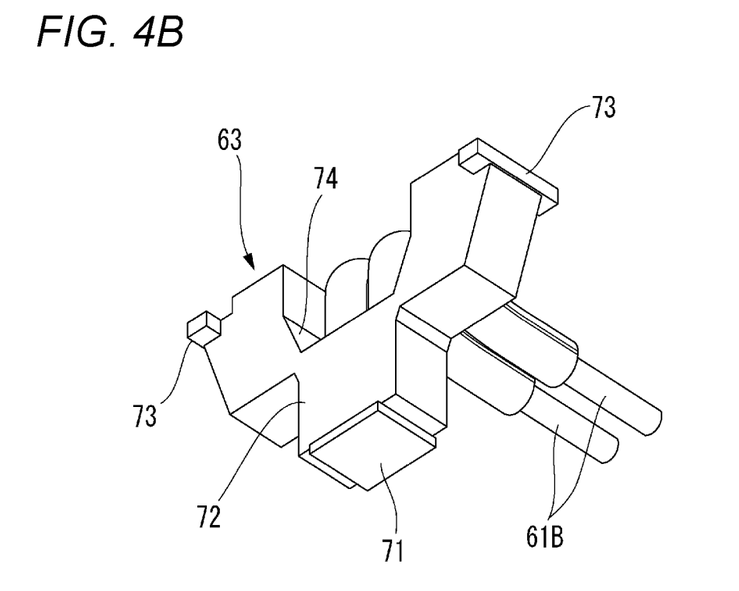
FIG. 4B is a perspective view from a lower side.

FIGS. 4A and 4B are views showing the thermistor 63, in which FIG. 4A is a perspective view from above, and FIG. 4B is a perspective view from a lower side.

As shown in FIGS. 4A and 4B, the thermistor 63 includes a main body portion 72 having a detection surface 71 on a lower portion thereof, and a pair of locking pieces 73 integrally formed with upper edge portions on both side portions of the main body portion 72.

The thermistor 63 is formed with a concave portion 74 on an upper portion of the main body portion 72 and between the pair of locking pieces 73, and the temperature measurement electric wires 61B are led out upward from a bottom portion of the concave portion 74 of the main body portion 72. In the temperature measurement electric wires 61B led out from the main body portion 72, root portions in the main body portion 72 are bent and extend to one side with respect to the main body portion 72. Accordingly, the temperature measurement electric wires 61B are extended to the side without protruding from an upper surface of the thermistor 63.

Figure 5:
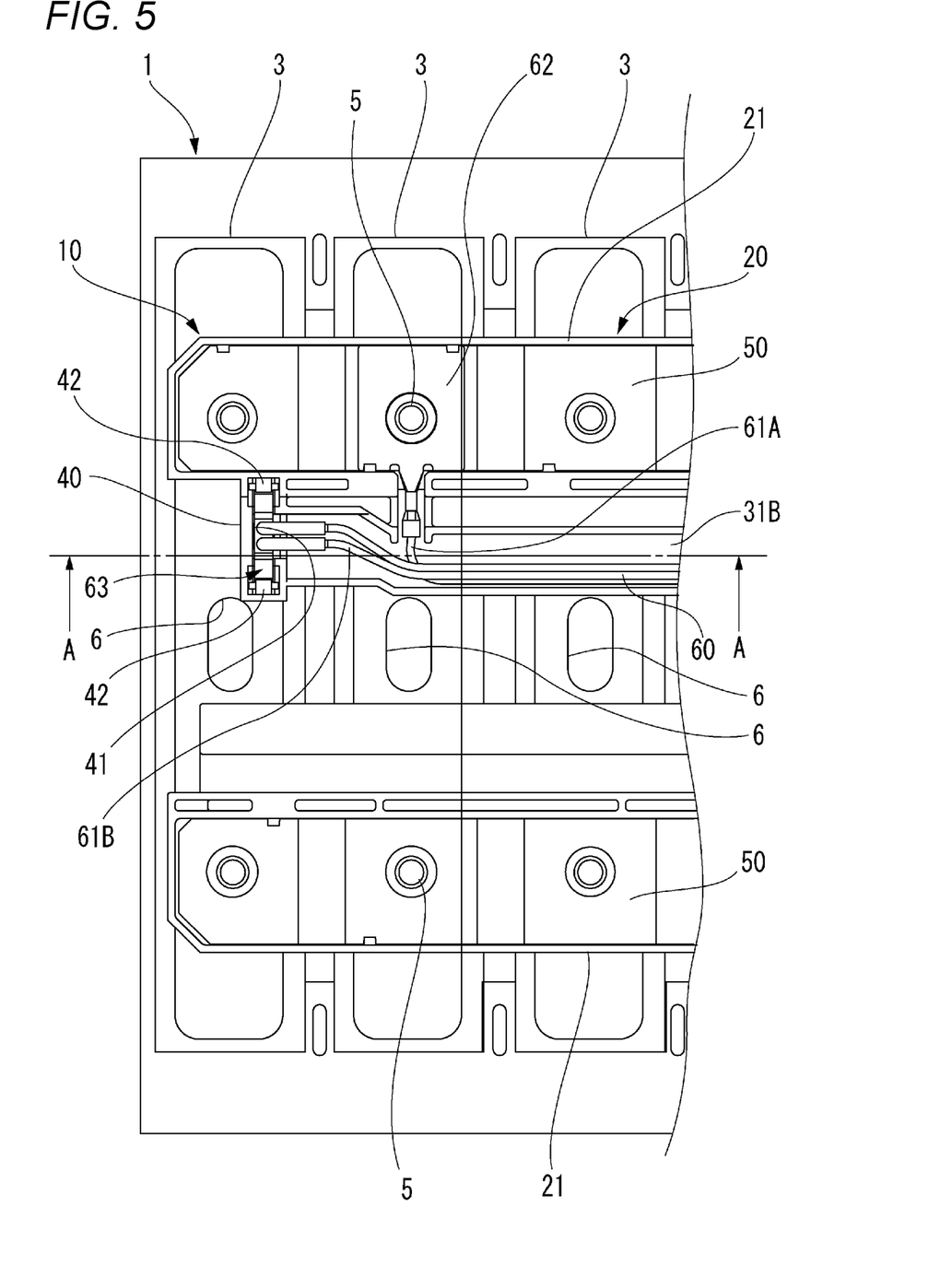
FIG. 5 is an enlarged plan view of one end side of the bus bar module mounted to a battery assembly.
Figure 6:
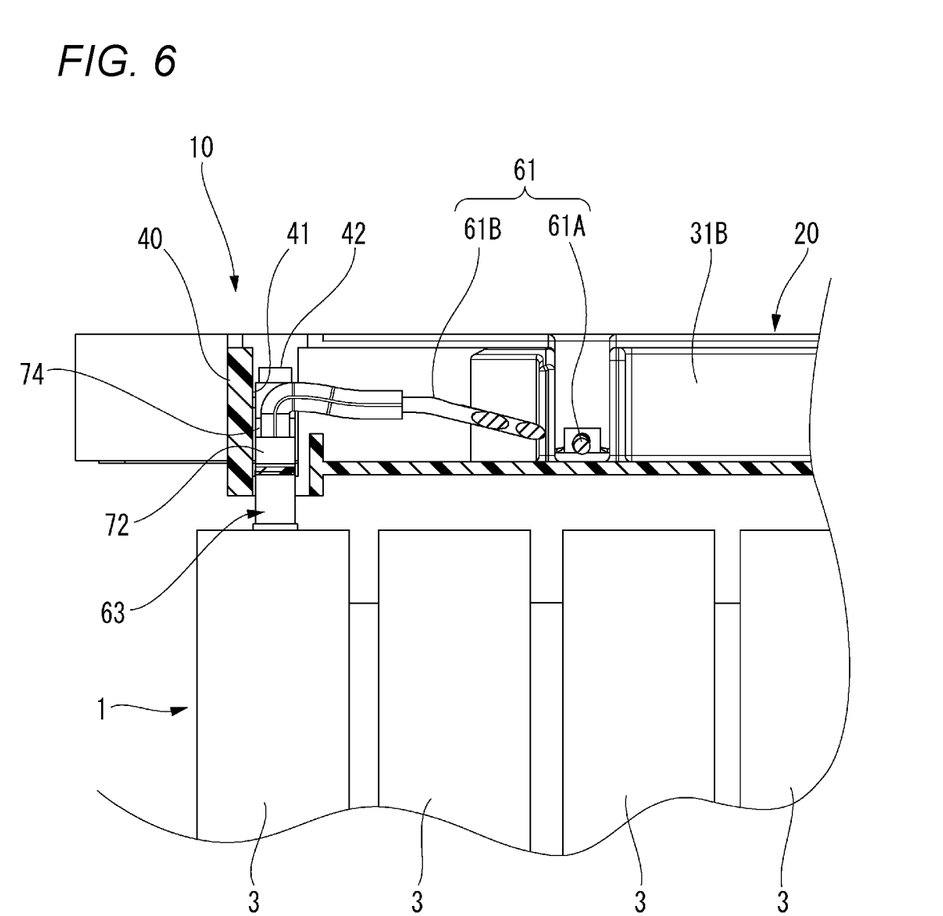
FIG. 6 is a sectional view taken along a line A-A in FIG. 5.

FIG. 5 is an enlarged plan view of one end side of the bus bar module 10 mounted to the battery assembly 1. FIG. 6 is a sectional view taken along a line A-A in FIG. 5.

As shown in FIGS. 5 and 6, the thermistor attachment portion 40 to which the thermistor 63 is attached includes a mounting hole 41 having a rectangular shape in a plan view. The mounting hole 41 is formed such that its longitudinal direction is perpendicular to a routing direction of the voltage detection electric wire 61A in the second electric wire routing groove portion 31B. Locking claws 42 protruding inward are formed at both ends of the thermistor attachment portion 40 in the longitudinal direction of the mounting hole 41.

The thermistor 63 is fitted and mounted to the mounting hole 41 from above the case 20 in the thermistor attachment portion 40. Then, the locking piece 73 of the thermistor 63 fitted and mounted to the mounting hole 41 is locked to the locking claw 42 of the mounting hole 41. Accordingly, the thermistor 63 is attached to the thermistor attachment portion 40 in a state of being fitted into the mounting hole 41, and the detection surface 71 is pressed against an upper surface of the single cell 3 to be in close contact, so that the temperature of the single cell 3 can be measured.

The thermistor 63 attached to the thermistor attachment portion 40 is arranged in such a direction that a drawing direction of the temperature measurement electric wire 61B coincides with the second electric wire routing groove portion 31B. In addition, in the thermistor 63, the temperature measurement electric wires 61B bent at the upper portion of the main body portion 72 and extending to the side are drawn into and routed in the second electric wire routing groove portion 31B. Accordingly, the temperature measurement electric wire 61B connected to the thermistor 63 is routed in the second electric wire routing groove portion 31B together with the voltage detection electric wire 61A connected to the voltage detection terminal 62 fastened to the bus bar 50.

As shown in FIG. 5, each of the single cells 3 constituting the battery assembly 1 is provided with a smoke exhaust portion 6 for discharging internal gas between the pair of electrodes 5 at the upper portion thereof. The bus bar module 10 attached to the battery assembly 1 including the single cells 3 having the smoke exhaust portions 6 is arranged at a position where the second electric wire routing groove portion 31B provided with the thermistor attachment portions 40 is separated from above the smoke exhaust portions 6 of the single cells 3 in a state of being attached to the upper portion of the battery assembly 1.

Figure 7A:
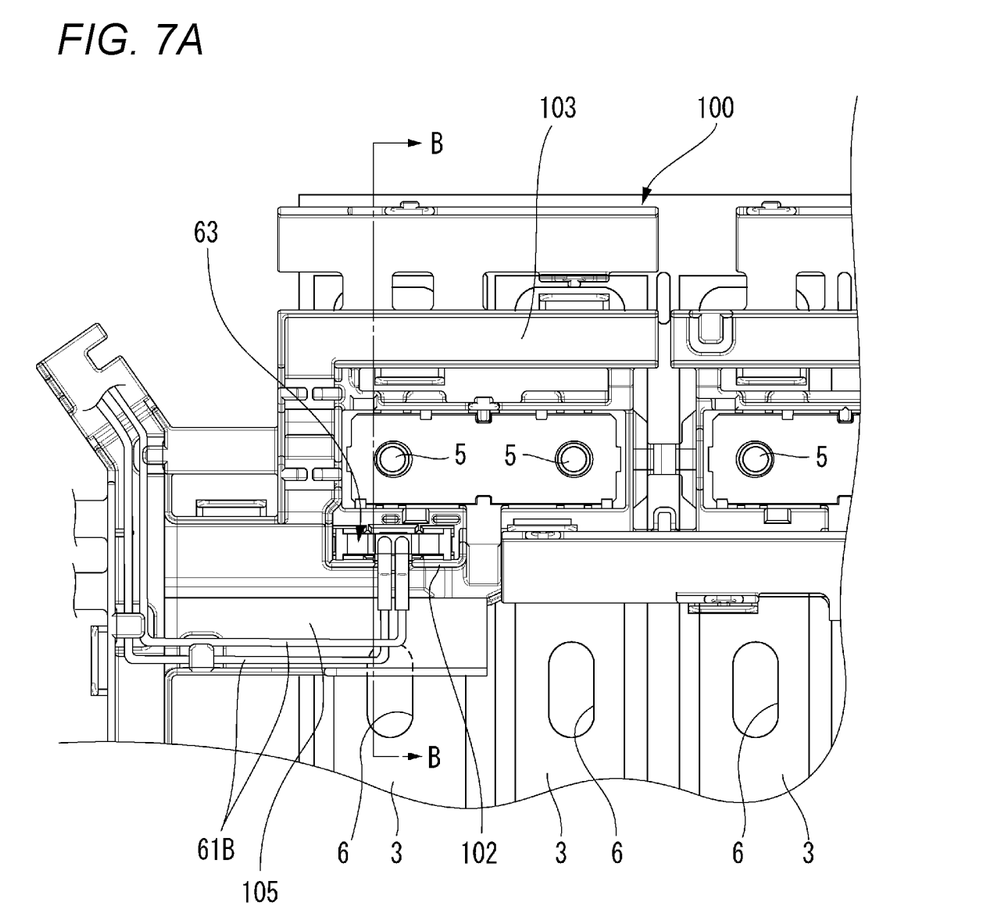
FIG. 7A is a partial plan view.
Figure 7B:
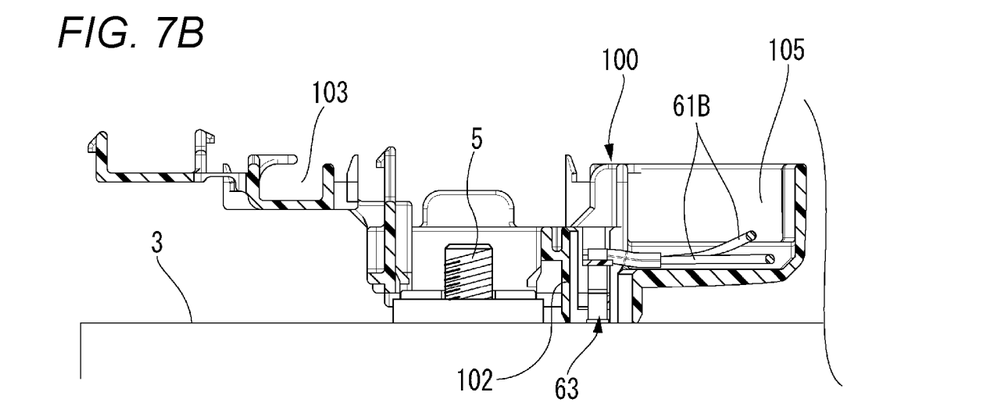
FIG. 7B is a sectional view taken along a line B-B in FIG. 7A.

Here, a bus bar module according to a reference example will be described. FIGS. 7A and 7B are views showing a bus bar module 100 according to the reference example including a thermistor accommodating portion 102 separated from an electric wire routing groove portion 103, in which FIG. 7A is a partial plan view, and FIG. 7B is a sectional view taken along a line B-B in FIG. 7A.

As shown in FIGS. 7A and 7B, in the bus bar module 100 according to the reference example, the thermistor accommodating portion 102 for accommodating the thermistor 63 is provided separately from the electric wire routing groove portion 103. In addition, in the bus bar module 100, a routing groove portion 105 accommodating the temperature measurement electric wires 61B drawn out from the thermistor 63 accommodated in the thermistor accommodating portion 102 protrudes above the smoke exhaust portion 6 provided between the electrodes of the single cell 3.

In the bus bar module 100 according to the reference example, since the thermistor accommodating portion 102 for accommodating the thermistor 63 is provided separately from the routing groove portion 105, an increase in size is caused. Moreover, as shown in FIG. 7A, the routing groove portion 105 accommodating the temperature measurement electric wires 61B connected to the thermistor 63 protrudes above the smoke exhaust portion 6 provided between the electrodes 5 of the single cell 3. Therefore, the routing groove portion 105 may hinder release of the gas from the smoke exhaust portion 6. In addition, as shown in FIG. 7B, the two temperature measurement electric wires 61B drawn out from the thermistor accommodating portion 102 and bent so as to follow the routing groove portion 105 overlaps with each other and becomes bulky upward, so that it is difficult to reduce height of the routing groove portion 105.

According to the bus bar module 10 according to the present embodiment, the thermistor attachment portion 40 to which the thermistor 63 is attached is provided in the second electric wire routing groove portion 31B in which the voltage detection electric wire 61A is routed. Accordingly, the size of the case 20 can be reduced as compared with the reference example in which the thermistor accommodating portion 102 is provided separately from the electric wire routing groove portion 103. In addition, it is possible to suppress such a problem that the thermistor accommodating portion 102 provided separately from the electric wire routing groove portion 103 protrudes above the smoke exhaust portion 6 provided between the electrodes 5 of the single cell 3 to inhibit the release of the gas.

The thermistor 63 is mounted to the thermistor attachment portion 40 from above the case 20, and the temperature measurement electric wire 61B is drawn out from the thermistor 63 to the direction (to the side) perpendicular to an attaching direction of the thermistor 63 to the thermistor attachment portion 40. That is, the temperature measurement electric wire 61B drawn out from the thermistor 63 attached to the thermistor attachment portion 40 is routed to the side perpendicular to the attaching direction of the thermistor 63 to the thermistor attachment portion 40. As a result, the height of the bus bar module 10 can be reduced by suppressing the bulkiness of the temperature measurement electric wires 61B drawn out from the thermistor 63 upward.

The temperature measurement electric wire 61B drawn to the side from the thermistor 63 is routed in the second electric wire routing groove portion 31B in a direction corresponding to the voltage detection electric wire 61A. As a result, the routing groove portion in which the temperature measurement electric wire 61B is routed can be eliminated, and the two temperature measurement electric wires 61B do not overlap each other, thereby further reducing the size of the case 20. Therefore, it is possible to suppress such a problem that the routing groove portion in which the temperature measurement electric wire 61B is routed protrudes above the smoke exhaust portion 6 provided between the electrodes 5 of the single cell 3 to inhibit the release of the gas.

The present invention is not limited to the embodiment described above, and modifications, improvements, or the like can be made as appropriate. In addition, the material, shape, size, number, arrangement position, or the like of each component in the embodiment described above are optional and are not limited as long as the present invention can be achieved.

Here, the bus bar module according to the above-described embodiment of the present invention will be briefly summarized in the following [1] to [3], respectively.

[1] A bus bar case (10) including:
a case (20) attached to a battery assembly (1) including a plurality of single cells (3);
a bus bar (50) supported by the case (20) and electrically connected to electrodes (5) of the plurality of single cells (3) of the battery assembly (1); and
a plurality of electric wires (61) routed in the case (20), wherein the plurality of electric wires (61) includes:
a plurality of voltage detection electric wires (61A) connected to a plurality of voltage detection terminals (62), respectively, the plurality of voltage detection terminals (62) being connected to the bus bar (50), and
a temperature measurement electric wire (61B) connected to a thermistor (63) configured to measure a temperature of at least one of the plurality of single cells (3),
wherein the case (20) includes an electric wire routing groove portion (first electric wire routing groove portion 31A, second electric wire routing groove portion 31B) in which the plurality of voltage detection electric wires (61A) are routed, and a thermistor attachment portion (40) to which the thermistor (63) is attached, and
wherein the thermistor attachment portion (40) is provided in the electric wire routing groove portion (second electric wire routing groove portion 31B).

[2] The bus bar module (10) according to the above [1], wherein the thermistor (63) is mounted to the thermistor attachment portion (40) from above the case (20), and
wherein the temperature measurement electric wire (61B) is drawn out from the thermistor (63) attached to the thermistor attachment portion (40) in a direction perpendicular to an attaching direction of the thermistor to the thermistor attachment portion (40).

[3] The bus bar module (10) according to [2], wherein the thermistor (63) is attached to the thermistor attachment portion (40) such that a drawing direction of the temperature measurement electric wire (61B) coincides with an extending direction of the electric wire routing groove portion (second electric wire routing groove portion 31B), and wherein the temperature measurement electric wire (61B) drawn out from the thermistor (63) is routed together with the plurality of voltage detection electric wires (61A) in the electric wire routing groove portion (second electric wire routing groove portion 31B).

The invention claimed is:
1. A bus bar module comprising:
a case attached to a battery assembly comprising a plurality of single cells;
a bus bar supported by the case and electrically connected to electrodes of the plurality of single cells of the battery assembly; and
a plurality of electric wires routed in the case,
wherein the plurality of electric wires comprise:
a plurality of voltage detection electric wires connected to a plurality of voltage detection terminals, respectively, the plurality of voltage detection terminals being connected to the bus bar, and
a temperature measurement electric wire connected to a thermistor configured to measure a temperature of at least one of the plurality of single cells,
wherein the case comprises:
an electric wire routing groove portion in which the plurality of voltage detection electric wires are routed, and
a thermistor attachment portion having a mounting hole to which the thermistor is attached,
wherein the mounting hole is formed such that a longitudinal direction of the mounting hole is perpendicular to a routing direction of the plurality of voltage detection electric wires in the electric wire routing groove portion, and
wherein the thermistor attachment portion is provided in the electric wire routing groove portion.

2. The bus bar module according to claim 1,
wherein the thermistor is mounted to the thermistor attachment portion from above the case, and
wherein the temperature measurement electric wire is drawn out from the thermistor attached to the thermistor attachment portion in a direction perpendicular to an attaching direction of the thermistor to the thermistor attachment portion.

3. The bus bar module according to claim 2,
wherein the thermistor is attached to the thermistor attachment portion such that a drawing direction of the temperature measurement electric wire coincides with an extending direction of the electric wire routing groove portion, and
wherein the temperature measurement electric wire drawn out from the thermistor is routed together with the plurality of voltage detection electric wires in the electric wire routing groove portion.

4. The bus bar module according to claim 1, wherein each of the single cells is provided with an exhaust portion, and
wherein the thermistor attachment portion does not overlap, in a vertical direction, the exhaust portion of any of the single cells.

5. The bus bar module according to claim 1, wherein a connection portion of the temperature measurement electric wire connected to the thermistor is bent such that the temperature measurement electric wire does not extend above a top surface of the thermistor.

* * * * *